US012592591B2

(12) United States Patent
Subbiah et al.

(10) Patent No.: US 12,592,591 B2
(45) Date of Patent: Mar. 31, 2026

(54) ELECTRIC MOTOR WITH INSULATED PERMANENT MAGNET

(71) Applicant: Atieva, Inc., Newark, CA (US)

(72) Inventors: Anandakumar Subbiah, Newark, CA (US); Vivek Meenakshi Sundaram, Newark, CA (US)

(73) Assignee: Atieva, Inc., Newark, CA (US)

( * ) Notice: Subject to any disclaimer, the term of this patent is extended or adjusted under 35 U.S.C. 154(b) by 272 days.

(21) Appl. No.: 18/467,331

(22) Filed: Sep. 14, 2023

(65) Prior Publication Data

US 2025/0096621 A1    Mar. 20, 2025

(51) Int. Cl.
*H02K 1/04*        (2006.01)
*H02K 15/03*       (2025.01)

(52) U.S. Cl.
CPC ............... *H02K 1/04* (2013.01); *H02K 15/03* (2013.01); *H02K 2215/00* (2021.08)

(58) Field of Classification Search
CPC .......... H02K 15/03; H02K 15/00; H02K 1/04; H02K 2215/00; H02K 1/00
See application file for complete search history.

(56) References Cited

U.S. PATENT DOCUMENTS

| | | | |
|---|---|---|---|
| 5,372,213 A | 12/1994 | Hasebe et al. | |
| 6,218,753 B1 | 4/2001 | Asano et al. | |
| 7,851,958 B2 | 12/2010 | Cai et al. | |
| 8,102,091 B2 | 1/2012 | Ionel | |
| 9,312,731 B2 | 4/2016 | Takahashi | |
| 10,797,562 B2 | 10/2020 | Dlala et al. | |
| 11,025,113 B2 | 6/2021 | Dlala | |

(Continued)

FOREIGN PATENT DOCUMENTS

| | | | | |
|---|---|---|---|---|
| DE | 3902480 A1 | * | 9/1989 | ............. H02K 15/03 |
| DE | 102012003453 A1 | | 9/2012 | |

(Continued)

OTHER PUBLICATIONS

Machine Translation of JP 5748395 B2 (Year: 2015).*

(Continued)

*Primary Examiner* — Alexander A Singh
*Assistant Examiner* — Charlie Frank Mann, Jr.
(74) *Attorney, Agent, or Firm* — Brake Hughes Bellermann LLP

(57)        ABSTRACT

A method of manufacturing a rotor for an electric motor comprises: positioning a permanent magnet within a magnet hole formed in a rotor body, the rotor body and the permanent magnet to form a rotor for an electric motor; providing an electrically insulating layer between the permanent magnet and a surface of the rotor body, the surface at least partially defines the magnet hole; performing an electrical continuity test on the permanent magnet and the rotor body while the permanent magnet is within the magnet hole and the electrically insulating layer is between the permanent magnet and the surface of the rotor body; determining whether the electrically insulating layer provides at least a threshold electric insulation to prevent of eddy currents circulating; and based on the electrically insulating layer providing at least the threshold electric insulation, approving the rotor for the electric motor.

11 Claims, 10 Drawing Sheets
(1 of 10 Drawing Sheet(s) Filed in Color)

(56)                   References Cited

U.S. PATENT DOCUMENTS

| | | | |
|---|---|---|---|
| 2007/0096578 A1 | 5/2007 | Jahns et al. | |
| 2013/0123058 A1 | 5/2013 | Maerkl | |
| 2013/0241340 A1 | 9/2013 | Koga et al. | |
| 2014/0028139 A1 | 1/2014 | Hamer et al. | |
| 2016/0380492 A1 | 12/2016 | Kawasaki et al. | |
| 2017/0278609 A1 * | 9/2017 | Hagiwara ............... | H01F 7/021 |
| 2019/0199148 A1 * | 6/2019 | Hattori .................... | H02K 1/28 |
| 2020/0235619 A1 * | 7/2020 | Uchida ................. | H02K 15/03 |

FOREIGN PATENT DOCUMENTS

| | | | | | |
|---|---|---|---|---|---|
| EP | 2048390 A2 | * | 4/2009 | ............... | H01F 3/02 |
| EP | 2264860 A1 | * | 12/2010 | ............... | H02K 1/04 |
| EP | 3468005 A1 | * | 4/2019 | ............ | H02K 15/10 |
| JP | 2012244838 A | * | 12/2012 | | |
| JP | 5748395 B2 | * | 7/2015 | | |
| JP | 2015220974 A | | 12/2015 | | |
| JP | 2016220390 A | | 12/2016 | | |

OTHER PUBLICATIONS

Machine Translation of DE 3902480 A1 (Year: 1989).*
Machine Translation of JP 2012244838 A (Year: 2012).*
Text Version of EP 3468005 A1 (Year: 2019).*
Text Version of EP 2048390 A2 (Year: 2009).*
Text Version of EP 2264860 A1 (Year: 2010).*
International Search Report and Written Opinion for PCT Application No. PCT/US2024/044498, mailed on Dec. 2, 2024, 19 pages.

\* cited by examiner

1300

Position permanent magnet — 1302

Provide electrically insulating layer — 1304

Perform electrical continuity test — 1306

Determine whether threshold electric insulation is met — 1308

Approve rotor — 1310

ELECTRIC MOTOR WITH INSULATED PERMANENT MAGNET

TECHNICAL FIELD

This document relates to an electric motor with an insulated permanent magnet.

BACKGROUND

In recent years, the world's transportation has begun a transition away from powertrains primarily driven by fossil fuels and toward more sustainable energy sources. The majority of such increasingly prevalent powertrains include electric motors powered by on-board energy storages. An electric motor can be a synchronous motor in which the rotor includes permanent magnets. The efficiency and manufacturing costs of the motor are important attributes of the vehicle as a whole.

SUMMARY

In a first aspect, a method of manufacturing a rotor for an electric motor comprises: positioning a permanent magnet within a magnet hole formed in a rotor body, wherein the rotor body and the permanent magnet are to form a rotor for an electric motor; providing an electrically insulating layer between the permanent magnet and a surface of the rotor body, wherein the surface at least partially defines the magnet hole; performing an electrical continuity test on the permanent magnet and the rotor body, the electrical continuity test performed while the permanent magnet is within the magnet hole and the electrically insulating layer is between the permanent magnet and the surface of the rotor body; determining, based on the electrical continuity test, whether the electrically insulating layer provides at least a threshold electric insulation between the permanent magnet and the rotor body, the threshold electric insulation corresponding to prevention of eddy currents circulating between the permanent magnet and the rotor body; and based on the electrically insulating layer providing at least the threshold electric insulation between the permanent magnet and the rotor body, approving the rotor for the electric motor.

Implementations can include any or all of the following features. Performing the electrical continuity test comprises contacting the permanent magnet with a first test lead, contacting the rotor body with a second test lead, and applying i) a voltage between the first and second test leads, or ii) a current to at least one of the first or second test leads. The electrical continuity test and the determination are performed before assembling the rotor into the electric motor, the method further comprising, based on the electrically insulating layer providing at least the threshold electric insulation between the permanent magnet and the rotor body, assembling the rotor into the electric motor. Providing the electrically insulating layer between the permanent magnet and the surface of the rotor body comprises applying the electrically insulating layer to the permanent magnet and thereafter inserting the permanent magnet and the electrically insulating layer into the magnet hole. Applying the electrically insulating layer to the permanent magnet comprises covering an entire outside of the permanent magnet with the electrically insulating layer. Applying the electrically insulating layer to the permanent magnet comprises covering only part of an outside of the permanent magnet with the electrically insulating layer. Providing the electrically insulating layer between the permanent magnet and the surface of the rotor body comprises applying the electrically insulating layer inside the magnet hole and thereafter inserting the permanent magnet into the magnet hole. Applying the electrically insulating layer inside the magnet hole comprises applying the electrically insulating layer to an entire inside surface of the magnet hole. Applying the electrically insulating layer inside the magnet hole comprises applying the electrically insulating layer to part of an inside surface of the magnet hole. The permanent magnet has an anti-corrosion layer covering an outer surface of the permanent magnet, and wherein providing the electrically insulating layer between the permanent magnet and the surface of the rotor body comprises positioning the electrically insulating layer between the anti-corrosion layer of the permanent magnet and the surface of the rotor body. The rotor comprises multiple permanent magnets positioned in respective ones of multiple magnet holes in the rotor body, the multiple magnet holes having respective surfaces, wherein the electrically insulating layer is provided between each of the multiple permanent magnets and the respective surface in the respective magnet hole of the rotor body, and wherein i) the electrical continuity test and ii) the determination are performed for each of the multiple permanent magnets.

In a second aspect, an electric motor comprises: a stator; and a rotor comprising: a rotor body having a magnet hole; a permanent magnet positioned within the magnet hole; an anti-corrosion layer covering an outer surface of the permanent magnet; and an electrically insulating layer at least partially covering the anti-corrosion layer, the electrically insulating layer electrically insulating the permanent magnet and the rotor body from each other and preventing eddy currents circulating between the permanent magnet and the rotor body.

Implementations can include any or all of the following features. The anti-corrosion layer comprises phosphate. The anti-corrosion layer comprises a passivation layer. The passivation layer comprises at least one material selected from the group consisting of zinc or nickel. The electrically insulating layer comprises epoxy resin. The electrically insulating layer comprises polytetrafluoroethylene. The electrically insulating layer comprises heat-curable expandable foam. The electrically insulating layer covers an entirety of the anti-corrosion layer. The electrically insulating layer covers only a part of the anti-corrosion layer. The electrically insulating layer covers an entire inside surface of the magnet hole. The electrically insulating layer covers only a part of an inside surface of the magnet hole. The permanent magnet is a rectangular block, the rectangular block having a longitudinal dimension that is parallel to a rotation axis of the rotor, the rectangular block having a transverse dimension substantially perpendicular to the longitudinal dimension, the longitudinal dimension being greater than the transverse dimension, wherein the electrically insulating layer extends along an entirety of the longitudinal dimension and is narrower than the transverse dimension. The electrically insulating layer is an insulating tape. The insulating tape includes at least one material selected from the group consisting of polyvinyl chloride or polyimide. The permanent magnet is a rectangular block, the rectangular block having a longitudinal dimension that is parallel to a rotation axis of the rotor, the rectangular block having a transverse dimension substantially perpendicular to the longitudinal dimension, the longitudinal dimension being greater than the transverse dimension, wherein the electrically insulating layer extends along an entirety of the transverse dimension and is narrower than the longitudinal dimension. The electrically insulating layer is an insulating tape. The insulating tape includes at least one material selected from the group consisting of polyvinyl chloride or polyimide. The rotor comprises multiple permanent magnets positioned in respective ones of multiple magnet holes in the rotor body, the multiple magnet holes having respective surfaces, wherein the electrically insulating layer is provided between each of the multiple permanent magnets and the respective surface in the respective magnet hole of the rotor body.

In a third aspect, an electric motor comprises: a stator; and a rotor comprising: a rotor body having a magnet hole; a permanent magnet positioned within the magnet hole; an anti-corrosion layer covering an outer surface of the permanent magnet; and means for electrically insulating the permanent magnet and the rotor body from each other and for preventing eddy currents circulating between the permanent magnet and the rotor body, the means at least partially covering the anti-corrosion layer.

BRIEF DESCRIPTION OF DRAWINGS

The patent or application file contains at least one drawing executed in color. Copies of this patent or patent application publication with color drawing(s) will be provided by the Office upon request and payment of the necessary fee.

Like reference symbols in the various drawings indicate like elements.

DETAILED DESCRIPTION

Figure 1:
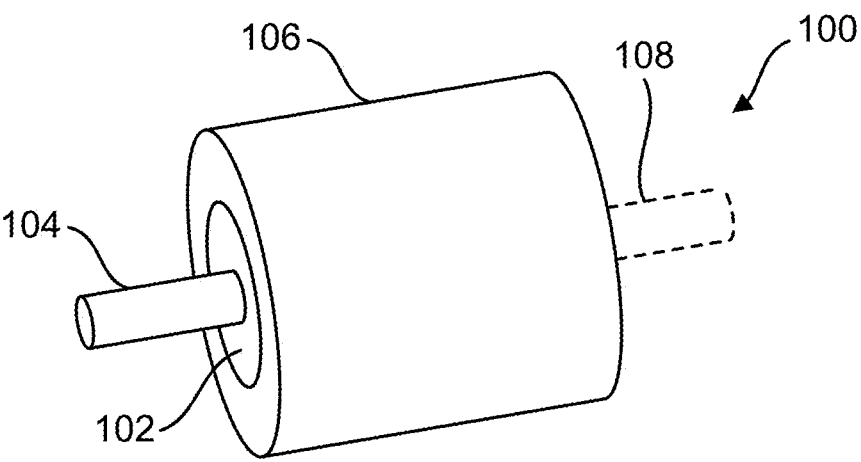
FIG. 1 shows a perspective view of an example of an electric motor.

This document describes examples of systems and techniques for reducing or eliminating the occurrence of certain components of eddy current induction in a permanent magnet of an electric motor. This can reduce the Joule losses (resistive losses) caused by eddy currents, and lower the operating temperature of the magnet, which lessens the requirements on the magnet composition (e.g., so that less or no heavy rare earth materials need to be used).

Examples described herein refer to a vehicle. As used herein, a vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons.

Examples described herein refer to a permanent magnet. As used herein, a permanent magnet is an object that includes magnetized material, the object creating a persistent magnetic field also in the absence of an applied magnetic field. A permanent magnet can include a ferromagnetic material or a ferrimagnetic material. A permanent magnet can be made using a single unit of magnetized material, or can be a laminate including two or more layers.

Examples described herein refer to an electrically insulating layer. As used herein, an electrically insulating layer has at least a threshold level of electrical resistance. The threshold level can be set based on the magnitudes of voltage or current against which the electrically insulating layer should protect. For example, the threshold level of electrical resistance between a permanent magnet and a rotor body can be such that it prevents eddy currents from circulating between the permanent magnet and the rotor body. Examples of electrically insulating materials include, but are not limited to, epoxy resin, polytetrafluoroethylene, heat-curable expandable foam, or insulating tape (e.g., made from polyvinyl chloride or polyimide). The electrically insulating layer can have a relatively high thermal conductivity to help dissipate heat that is generated inside the permanent magnet.

Examples described herein refer to an electrical continuity test. As used herein, an electrical continuity test indicates, directly or indirectly, the amount of electric resistance between at least two locations. When an electrical continuity test is performed on a permanent magnet and a rotor body, the test can be performed with test leads, a voltage or current can be applied, and the amount of resistance can be measured, determined, inferred, estimated, or the like.

Examples described herein refer to an eddy current. As used herein, an eddy current is a loop of electric current that is a result of the voltage induced by a changing magnetic field. An eddy current can occur solely within a conductive component (e.g., a rotor body or a permanent magnet), or can flow from one component to another (e.g., from the rotor body to the permanent magnet) if the components are not electrically insulated from each other.

Examples described herein refer to an anti-corrosion layer. As used herein, an anti-corrosion layer is any substance applied to an object that decreases the rate of corrosion. Examples of anti-corrosion layer materials include, but are not limited to, coatings, phosphate, passivation material, zinc, nickel, and combinations thereof. An anti-corrosion layer can be electrically conductive.

Examples described herein refer to a top, bottom, front, or rear. These and similar expressions identify things or aspects in a relative way based on an express or arbitrary notion of perspective. That is, these terms are illustrative only, used for purposes of explanation, and do not necessarily indicate the only possible position, direction, and so on.

Figure 2:
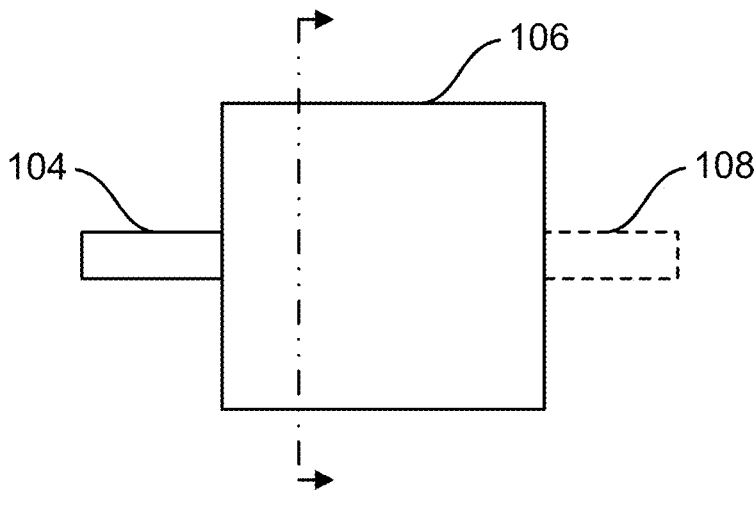
FIG. 2 shows a front view of the electric motor of FIG. 1.

FIG. 1 shows a perspective view of an example of an electric motor 100. FIG. 2 shows a front view of the electric motor 100 of FIG. 1. The electric motor 100 can be used with one or more other examples described elsewhere herein. The electric motor 100 is schematically illustrated and some components are not shown for simplicity.

Here, the electric motor 100 has a rotor 102 assembled to a rotor shaft 104. The rotor 102 and the rotor shaft 104 are mounted inside a stator 106 so as to be able to rotate in one direction or in both directions. Either, or both of, the rotor 102 or the stator 106 can be manufactured by forming a stack of substantially flat laminations having profiles created by stamping or otherwise. The rotor shaft 104 extends from one side of the electric motor 100 to apply torque to, and/or receive torque from, a wheel axle with one or more road wheels. The electric motor 100 can have a rotor shaft 108 (here shown in phantom) extending in a direction opposite to that of the rotor shaft 104. For example, each of the rotor shaft 104 and/or 108 can engage with a gearbox or other transmission (not shown).

The electric motor 100 is a permanent magnet motor, and the rotor 102 includes permanent magnets that are positioned within a rotor body, according to the present subject matter. During operation, the permanent magnets will produce a component of the motor torque. The permanent magnets can be installed within voids/slots of the rotor body using any of multiple techniques, including, but not limited to, by gluing the permanent magnet, such as by using an epoxy resin; by transfer molding, such as by placing the permanent magnet in the slot and molding a resin or thermosetting plastic material around the permanent magnet; or by mechanical retention, such as by placing the permanent magnet in the slot and mechanically securing the permanent magnet in place. In the present subject matter, the permanent magnets are electrically insulated from the rotor body, which improves the efficiency, and/or reduces the manufacturing cost, of the electric motor 100.

Figure 3:
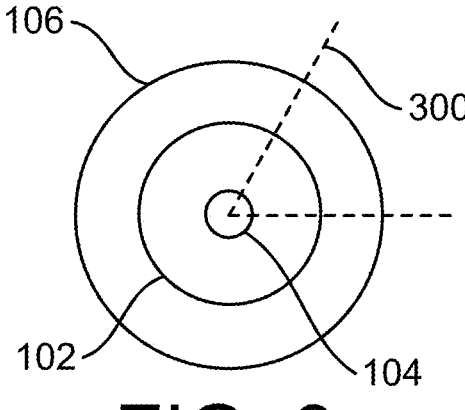
FIG. 3 shows an example cross section of the electric motor of FIG. 2.

FIG. 3 shows an example cross section of the electric motor 100 of FIG. 2. The rotor 102 and the stator 106 can be substantially rotationally symmetric about an axis of rotation of the rotor shaft 104. For example, the cross section can illustrate one lamination of the rotor 102, and one lamination of the stator 106. The cross section schematically identifies a sector 300 that includes any part of the electric motor 100. In some examples presented below where a rotor is described, only the part of the rotor within the sector 300 is shown for simplicity, with a remainder of the rotor having corresponding feature. For example, when the rotor 102 is made of laminations, the sector 300 can show a portion of such a lamination that is rotationally repeated one or more times around the rotor 102 in such a lamination.

Figure 4:
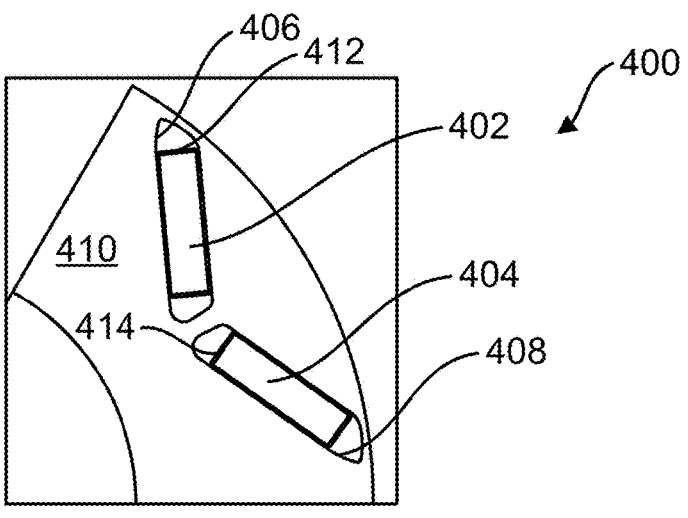
FIG. 4 shows an example of permanent magnets positioned in magnet holes of a rotor lamination.

FIG. 4 shows an example 400 of permanent magnets 402 and 404 positioned in magnet holes 406 and 408 respectively, of a rotor lamination 410. The rotor of an electric motor can include multiple rotor laminations stacked to form a rotor body. The example 400 or aspects thereof can be used with one or more other examples described elsewhere herein. An electrically insulating layer 412 covers an entirety of the permanent magnet 402. For example, when the permanent magnet 402 initially has an anti-corrosion layer on its outside, the electrically insulating layer 412 can cover an entirety of the anti-corrosion layer. An electrically insulating layer 414 covers an entirety of the permanent magnet 404. Similarly, the electrically insulating layer 414 can cover an entirety of an anti-corrosion layer of the permanent magnet 404. The electrically insulating layer 412 is applied to the permanent magnet 402 before insertion into the magnet hole 406. Similarly, the electrically insulating layer 414 is applied to the permanent magnet 404 before insertion into the magnet hole 408.

Figure 5:
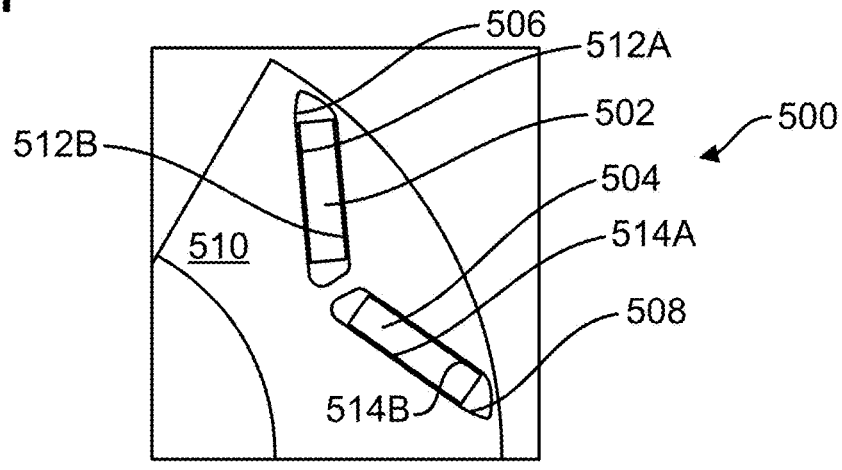
FIG. 5 shows another example of permanent magnets positioned in magnet holes of a rotor lamination.

FIG. 5 shows another example 500 of permanent magnets 502 and 504 positioned in magnet holes 506 and 508, respectively, of a rotor lamination 510. The example 500 or aspects thereof can be used with one or more other examples described elsewhere herein. Electrically insulating layers 512A-512B cover only part of the permanent magnet 502. For example, when the permanent magnet 502 initially has an anti-corrosion layer on its outside, each of the electrically insulating layers 512A-512B can cover only a part of the anti-corrosion layer. Electrically insulating layers 514A-514B cover only part of the permanent magnet 504. For example, when the permanent magnet 504 initially has an anti-corrosion layer on its outside, each of the electrically insulating layers 514A-514B can cover only a part of the anti-corrosion layer. For example, the electrically insulating layers 512A-512B can be applied to the permanent magnets 502 and 504, respectively, before their respective insertions into the magnet holes 506 and 508. As another example, the electrically insulating layers 512A-512B can be applied within the magnet holes 506 and 508, respectively, before the insertions of the permanent magnets 502 and 504, respectively.

Figure 6:
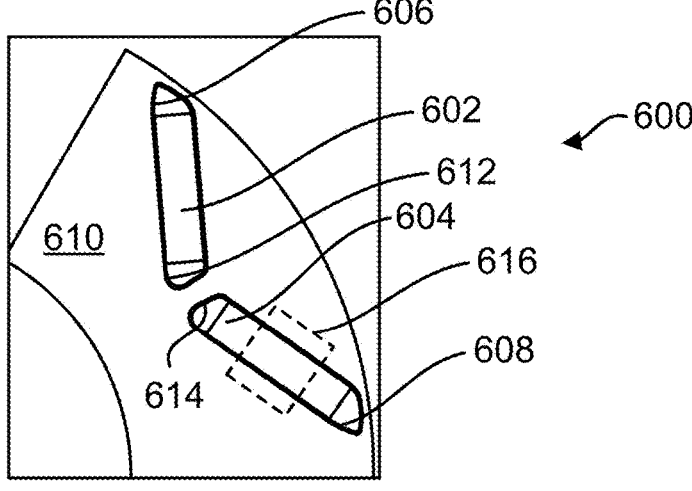
FIG. 6 shows another example of permanent magnets positioned in magnet holes of a rotor lamination.

FIG. 6 shows another example 600 of permanent magnets 602 and 604 positioned in magnet holes 606 and 608, respectively, of a rotor lamination 610. The example 600 or aspects thereof can be used with one or more other examples described elsewhere herein. An electrically insulating layer 612 covers an entire inside surface of the magnet hole 606. An electrically insulating layer 614 covers an entire inside surface of the magnet hole 608. The electrically insulating layers 612 and 614 are applied to the magnet holes 606 and 608, respectively, before the respective insertions of the permanent magnets 602 and 604. Some examples in the following are described with reference to only a limited area of a rotor lamination for simplicity, the location of such area being represented, for illustrative purposes only, by an area 616 on the rotor lamination 610.

Figure 7:
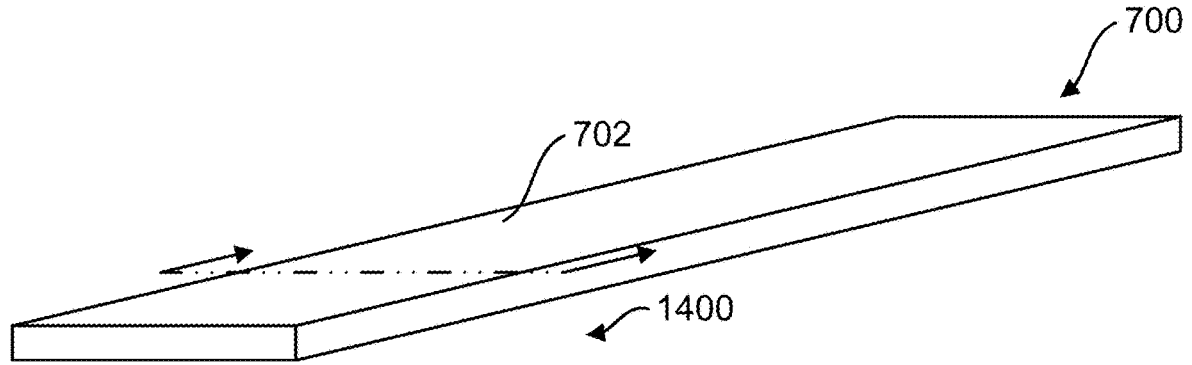
FIG. 7 shows a perspective view of a permanent magnet.
Figure 8:
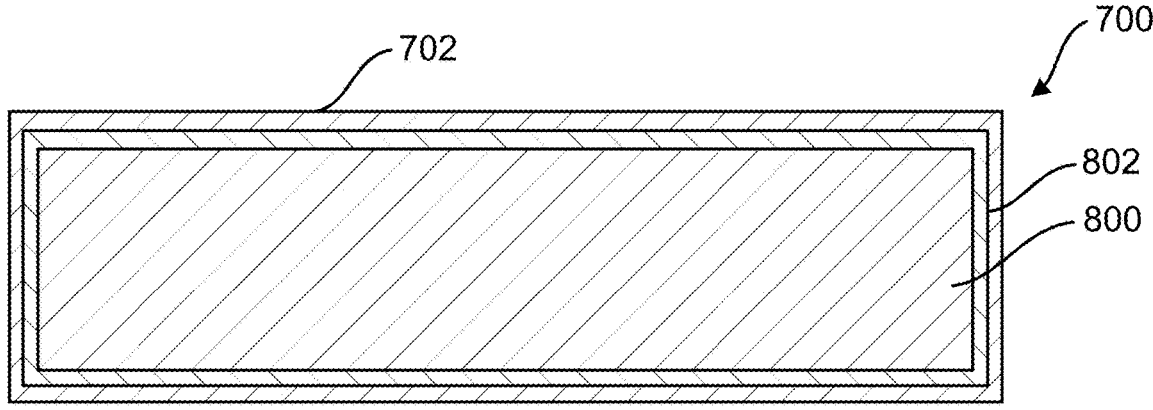
FIG. 8 shows an example cross section of the permanent magnet of FIG. 7.

FIG. 7 shows a perspective view of a permanent magnet 700. FIG. 8 shows an example cross section of the permanent magnet 700 of FIG. 7. The permanent magnet 700 can be used with one or more other examples described elsewhere herein. An electrically insulating layer 702 covers an entire outside of the permanent magnet 700. The cross section illustrates that the permanent magnet 700 can include a body 800 of a magnetic material. The body 800 can have any shape, including but not limited to the shape shown in this block, which is substantially a rectangular block. The entire outer surface of the body 800 can be covered by an anti-corrosion layer 802 to prevent deterioration of the body 800 due to corrosion (e.g., rusting). The anti-corrosion layer 802 can include phosphate. The anti-corrosion layer 802 can include a passivation layer. For example, the anti-corrosion layer 802 can include at least one material selected from the group consisting of zinc or nickel. The electrically insulating layer 702 and the anti-corrosion layer 802 can have substantially the same thickness as each other, or can have different thicknesses than each other. As such, one of the electrically insulating layer 702 or the anti-corrosion layer 802 can be thinner than the other.

Figure 9:
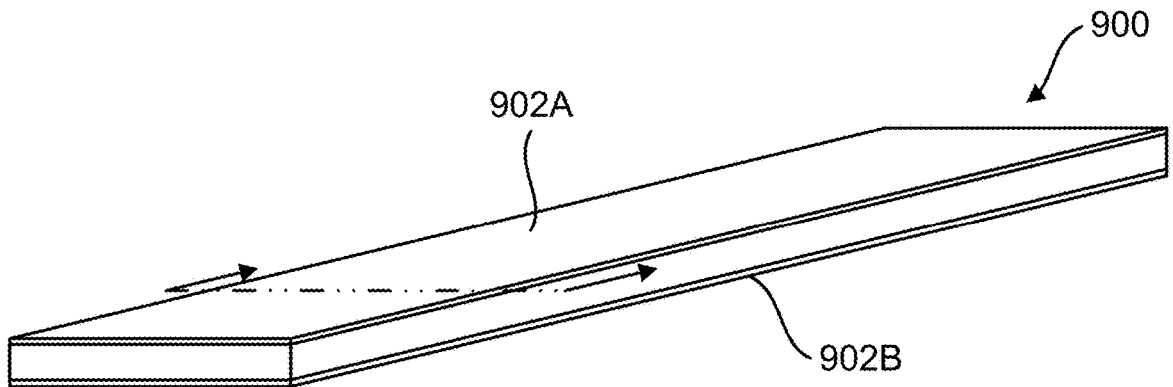
FIG. 9 shows a perspective view of a permanent magnet.
Figure 10:
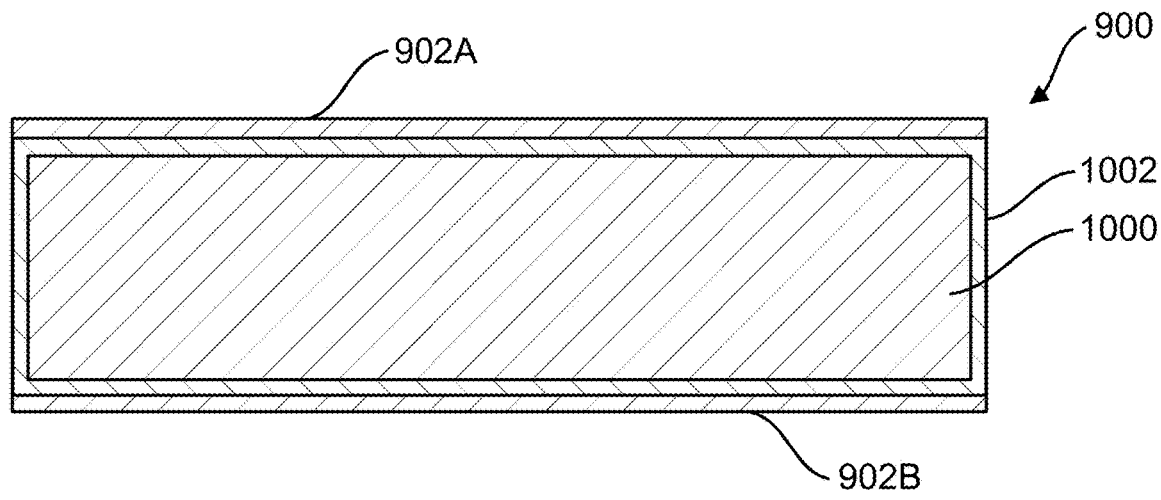
FIG. 10 shows an example cross section of the permanent magnet of FIG. 9.

FIG. 9 shows a perspective view of a permanent magnet 900. FIG. 10 shows an example cross section of the permanent magnet 900 of FIG. 9. The permanent magnet 900 can be used with one or more other examples described elsewhere herein. Electrically insulating layer 902A covers a first side of the permanent magnet 900. Electrically insulating layer 902B covers a second side of the permanent magnet 900 opposite from, and parallel to, the first side. The cross section illustrates that the permanent magnet 900 can include a body 1000 of a magnetic material. The body 1000 can have any shape, including but not limited to the shape shown in this block, which is substantially a rectangular block. The entire outside of the body 1000 can be covered by an anti-corrosion layer 1002 to prevent deterioration of the body 1000 due to corrosion (e.g., rusting). The anti-corrosion layer 1002 can include phosphate. The anti-corrosion layer 1002 can include a passivation layer. For example, the anti-corrosion layer 1002 can include at least one material selected from the group consisting of zinc or nickel. The electrically insulating layers 902A-902B can have substantially the same thickness as each other, or can have different thicknesses than each other. Either or both of the electrically insulating layers 902A-902B, and the anti-corrosion layer 1002, can have substantially the same thickness as each other, or can have different thicknesses than each other. As such, the anti-corrosion layer 1002 can be thinner or thicker than either or both of the electrically insulating layers 902A-902B.

Figure 11A:
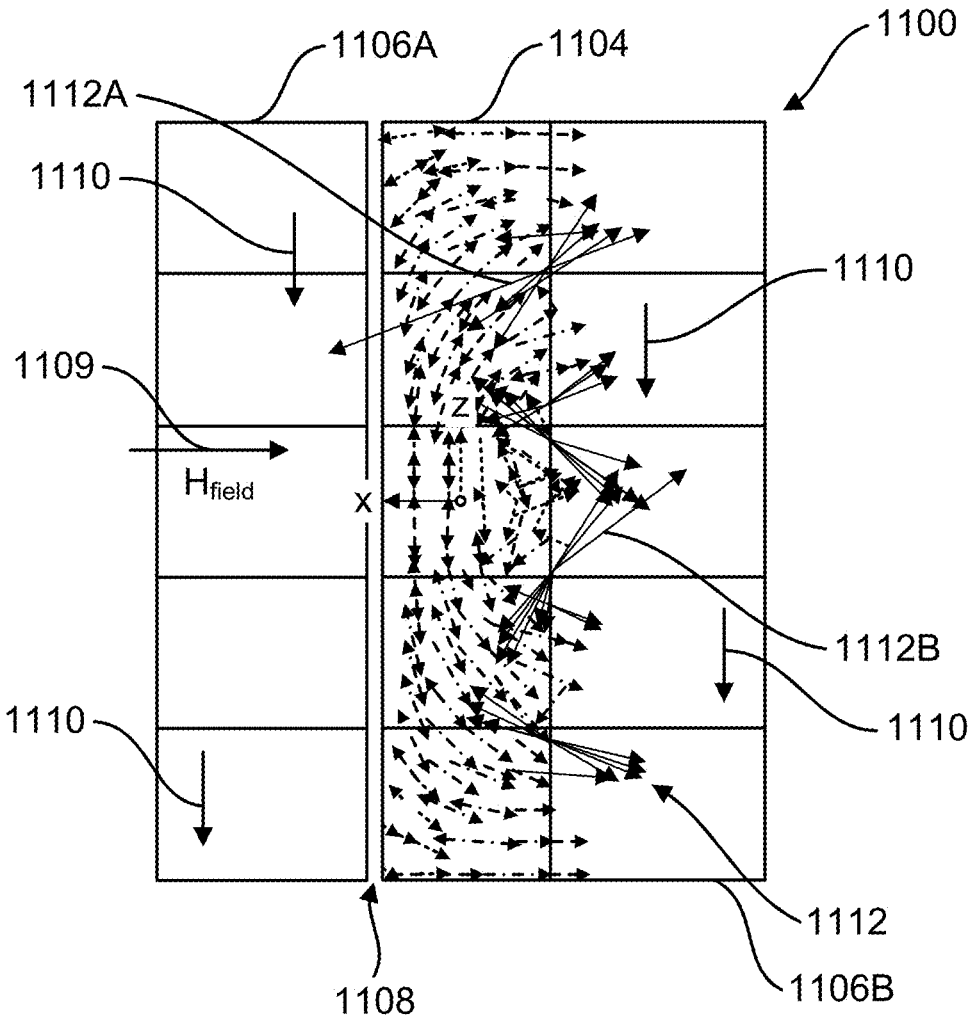
FIGS. 11A-11B show examples of qualitative simulations of eddy current paths.
Figure 11B:
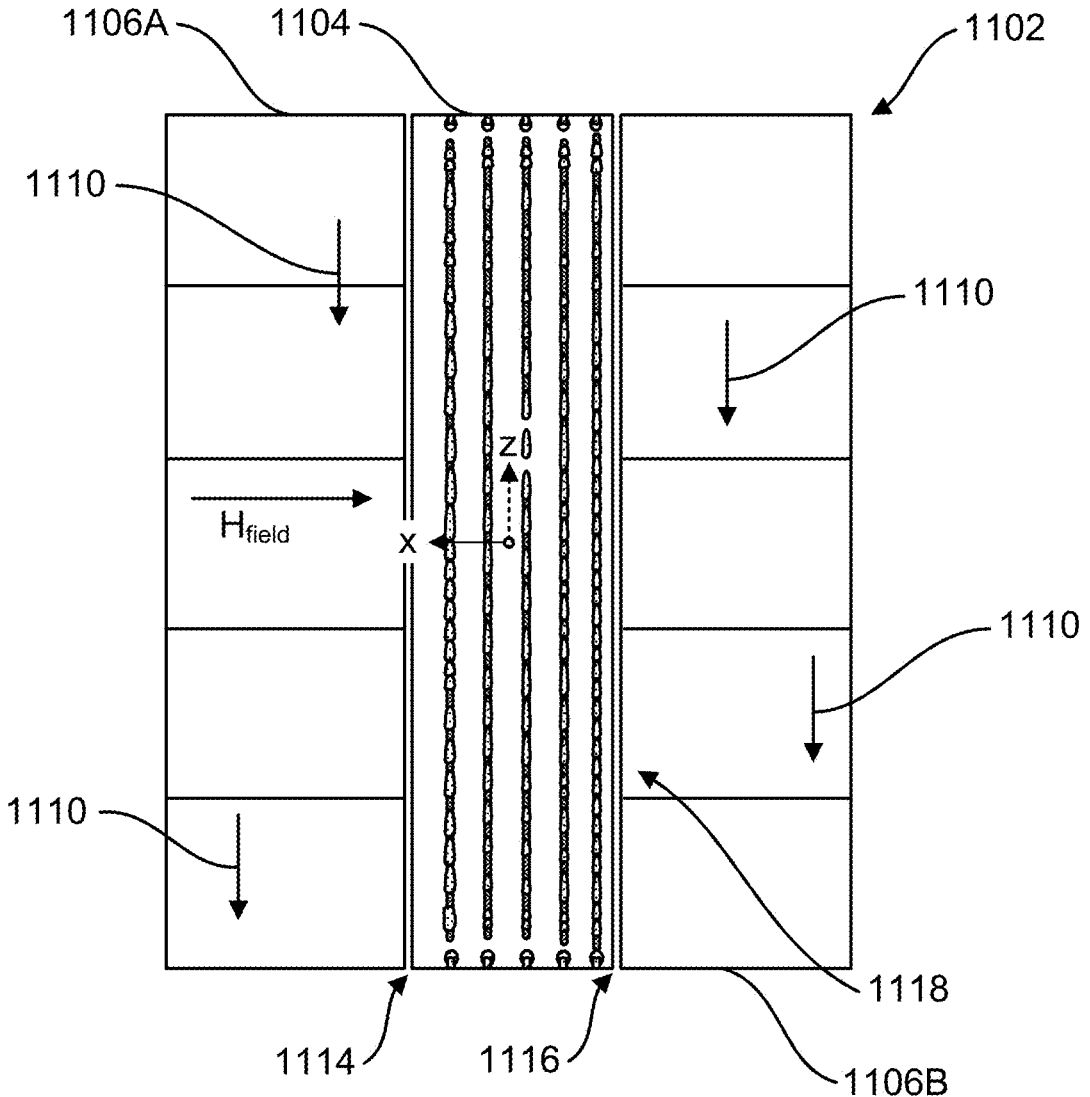

FIGS. 11A-11B show examples 1100 and 1102 of qualitative simulations of eddy current paths. The examples 1100 and/or 1102 can be used with one or more other examples described elsewhere herein. Both of the examples 1100 and 1102 show a permanent magnet 1104 with a rotor lamination portion 1106A on one side and a rotor lamination portion 1106B on an opposite side. For example, with reference again briefly to FIG. 6, the permanent magnet 1104 and the rotor lamination portions 1106A-1106B can be the portions of a rotor indicated by the area 616 of the rotor lamination 610.

In the example 1100, an electrically insulating layer 1108 is situated between the permanent magnet 1104 and the rotor lamination portion 1106A. On the other hand, no electrically insulating layer is situated between the permanent magnet 1104 and the rotor lamination portion 1106B. For example, the permanent magnet 1104 can be electrically short-circuited to (e.g., abutting) the rotor lamination portion 1106B. That is, the permanent magnet 1104 may be covered by an anti-corrosion layer, but the anti-corrosion layer does not provide electrical insulation.

An arrow 1109 indicates that an H magnetic field exists in the rotor during operation of the electric motor, the H magnetic field extending through the rotor lamination portion 1106A, the permanent magnet 1104, and the rotor lamination portion 1106B. As a result of the H magnetic field, eddy currents are induced in the rotor. More particularly, eddy currents can be induced in the rotor core and the permanent magnet 1104 due to space harmonics created by the magnetic field of the stator and also due to harmonics from switching performed in the inverter of the electric motor.

The simulation on which the example 1100 is based illustrates how current densities (e.g., measured in ampere per square meter, or A/m$^2$) can be distributed in the rotor body and the permanent magnet 1104, given the absence of any electrically insulating layer between the permanent magnet 1104 and the rotor lamination portion 1106B. Here, eddy currents can be induced inside the rotor lamination portions 1106A-1106B, as indicated by arrows 1110. Eddy currents can also be induced inside the permanent magnet 1104, as indicated by arrows 1112. For example, arrows 1112A and 1112B indicate that the current densities are such that eddy currents are circulating between the permanent magnet 1104 and the rotor lamination portion 1106B.

Induction of eddy currents is associated with losses and other suboptimal performance. For example, the eddy currents associated with the arrows 1112A and 1112B circulate between the permanent magnet 1104 and the rotor lamination portion 1106B and as such generate heat in the rotor due to electric resistance, thereby dissipating energy. As another example, due to the expected heat generation the temperature in the permanent magnet 1104 will reach a certain level during the expected operation of the electric motor; the permanent magnet 1104 must therefore be selected so as to have a temperature rating that accommodates the expected operating temperature. Generally speaking, a permanent magnet with a higher temperature rating costs more than a permanent magnet with a lower temperature rating. As such, the rotor in the example 1100 is subject to eddy current losses due to the eddy currents circulating between the permanent magnet 1104 and the rotor lamination portion 1106B, and also subject to the requirement of a relatively high temperature rating for the permanent magnet 1104.

In the example 1102, an electrically insulating layer 1114 is situated between the permanent magnet 1104 and the rotor lamination portion 1106A. Also, an electrically insulating layer 1116 is situated between the permanent magnet 1104 and the rotor lamination portion 1106B. As such, in the example 1102 the permanent magnet 1104 is not short-circuited to either of the rotor lamination portions 1106A-1106B. Arrows 1118 indicate that eddy currents are induced in the permanent magnet 1104, but that no (or relatively little) eddy currents circulate between the permanent magnet 1104 and either of the rotor lamination portions 1106A-1106B. That is, certain components of eddy currents can be reduced or eliminated. As such, the rotor in the example 1102 is subject to little or no eddy current losses due to current circulation between the permanent magnet 1104 and either of the rotor lamination portions 1106A-1106B, and also the permanent magnet 1104 can have a lower temperature rating.

Figure 12:
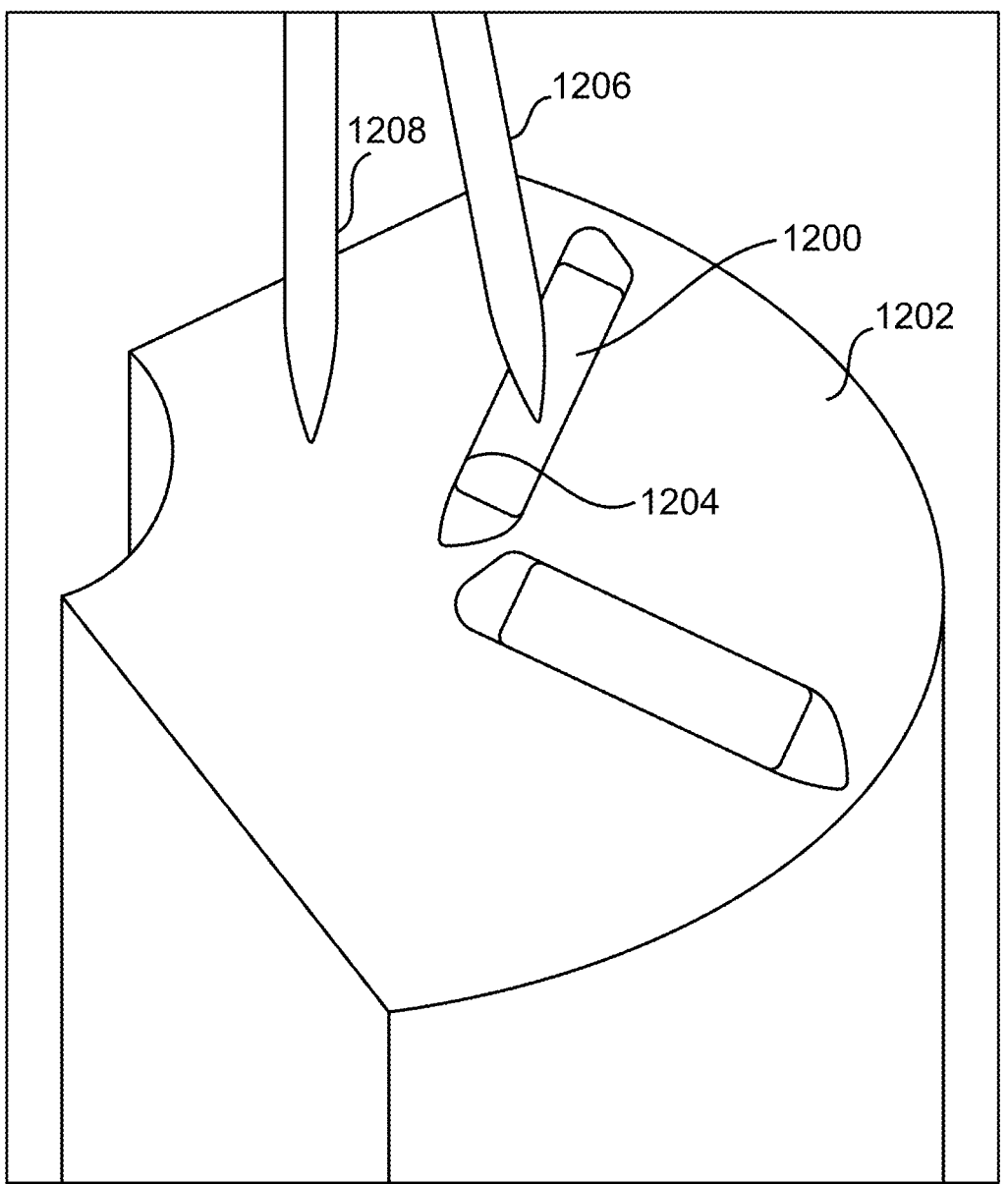
FIG. 12 shows an example of performing an electrical continuity test on a permanent magnet and a rotor body.

FIG. 12 shows an example of performing an electrical continuity test on a permanent magnet 1200 and a rotor body 1202. For example, with reference again briefly to FIG. 6, the permanent magnet 1200 and the rotor body 1202, here shown in perspective, can be the portions of a rotor indicated by the area 616 of the rotor lamination 610. The permanent magnet 1200 and/or the rotor body 1202 can be used with one or more other examples described elsewhere herein.

The electrical continuity test is performed while the permanent magnet 1200 is within a magnet hole 1204 of the rotor body 1202 and an electrically insulating layer is between the permanent magnet 1200 and the surface of the rotor body 1202. In some implementations, the electrically insulating layer can correspond to any of the examples described above with reference to FIG. 4, 5, or 6. The electrical continuity test can evaluate the dielectric strength of the electrically insulating layer. Performing the electrical continuity test can include contacting the permanent magnet 1200 with a test lead 1206, and contacting the rotor body 1202 with a test lead 1208. Each of the test leads 1206-1208 can include a terminal of an electrical measuring instrument capable of testing resistance, including, but not limited to, a probe of a multimeter. Performing the electrical continuity test can include applying a voltage between the test leads 1206-1208, or applying a current to at least one of the test leads 1206 or 1208. The electrical continuity test determines, estimates or indicates, etc. the resistance between the permanent magnet 1200 and the rotor body 1202.

One or more threshold electric insulations can be defined. A determination can be performed whether the electrically insulating layer provides at least the threshold electric insulation between the permanent magnet 1200 and the rotor body 1202. When the determination indicates the electrically insulating layer providing at least the threshold electric insulation between the permanent magnet 1200 and the rotor body 1202, eddy current circulation between the permanent magnet 1200 and the rotor body 1202 is substantially (e.g., completely) eliminated. The threshold electric insulation can be defined in terms of any property that the electrical continuity test reflects. For example, and without limitation, the threshold electric insulation can be defined as an electrical resistance. Based on the electrically insulating layer providing at least the threshold electric insulation between the permanent magnet 1200 and the rotor body 1202, the rotor can be approved for the electric motor. For example, the electrical continuity test and the determination can be performed before assembling the rotor into the electric motor, and based on the electrically insulating layer providing at least the threshold electric insulation between the permanent magnet and the rotor body, the rotor can be assembled into the electric motor. In contrast, based on the electrically insulating layer not providing at least the threshold electric insulation between the permanent magnet and the rotor body, the rotor can instead be reworked to improve the electrically insulating layer, or discarded.

Figure 13:
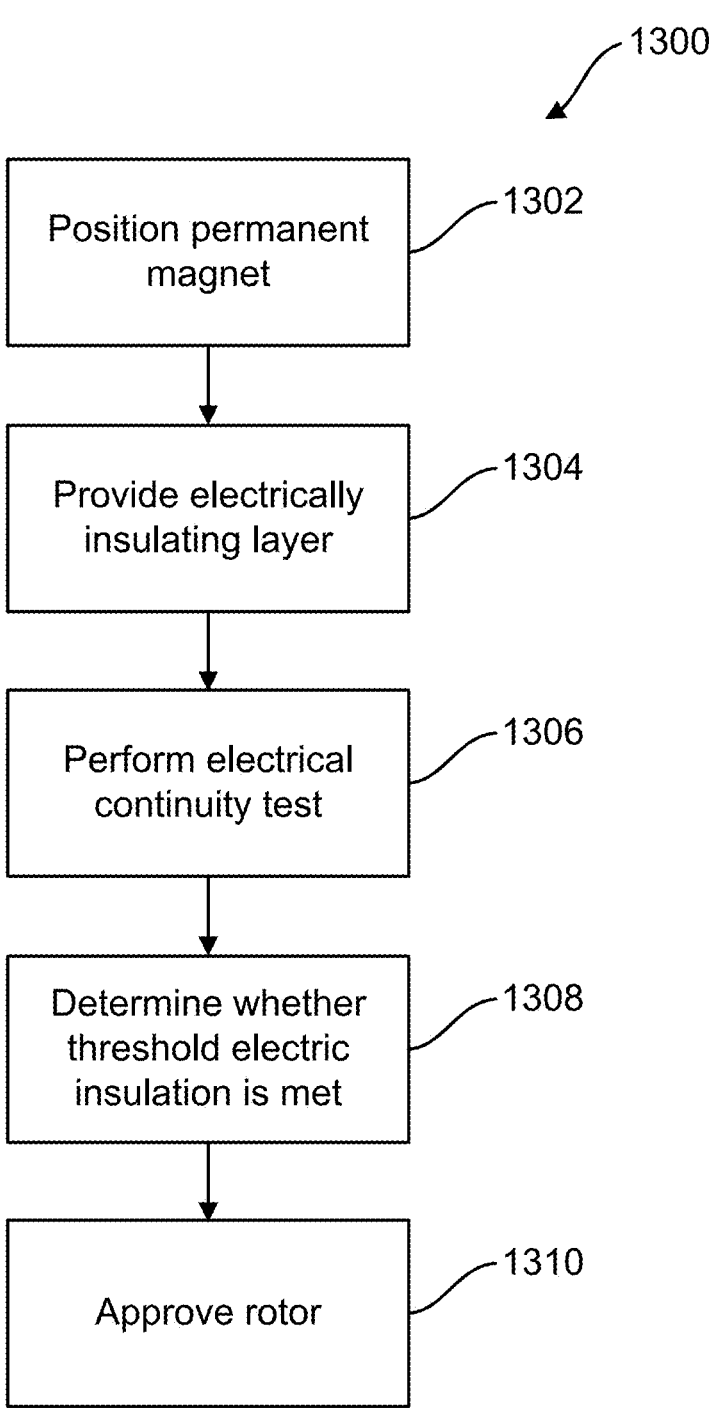
FIG. 13 shows an example of a method.

FIG. 13 shows an example of a method 1300. The method 1300 can be used with one or more other examples described elsewhere herein. More or fewer operations than shown can be performed. Two or more operations can be performed in a different order unless otherwise indicated.

In operation 1302, a permanent magnet can be positioned within a magnet hole formed in a rotor body. The rotor body and the permanent magnet are to form a rotor for an electric motor. In some implementations, the permanent magnet, magnet hole, and the rotor body can correspond to any of the examples described above with reference to FIG. 4, 5, or 6.

In operation 1304, an electrically insulating layer can be provided between the permanent magnet and a surface of the rotor body, wherein the surface at least partially defines the magnet hole. For example, in the example 400 of FIG. 4, the electrically insulating layer 412 can be provided onto the permanent magnet 402 and thereafter the assembly can be installed in the magnet hole 406. As another example, in the example 500 of FIG. 5, the electrically insulating layers 512A-512B can be provided onto the permanent magnet 502 before the assembly is installed in the magnet hole 506; or, the electrically insulating layers 512A-512B can be provided within the magnet hole 506 before the permanent magnet 502 is installed in the magnet hole 506. As another example, in the example 600 of FIG. 6, the electrically insulating layer 612 can be provided within the magnet hole 606 before the permanent magnet 602 is installed in the magnet hole 606.

In operation 1306, an electrical continuity test can be performed. For example, the electrical continuity test can be performed substantially as described with reference to FIG. 12.

In operation 1308, a determination can be performed, based on the electrical continuity test, whether the electrically insulating layer provides at least a threshold electric insulation between the permanent magnet and the rotor body. The threshold electric insulation corresponds to prevention of eddy currents circulating between the permanent magnet and the rotor body.

In operation 1310, based on the electrically insulating layer providing at least the threshold electric insulation between the permanent magnet and the rotor body, the rotor can be approved for the electric motor. The approval can be obtained before or after the rotor is installed in the electric motor.

Figure 14:
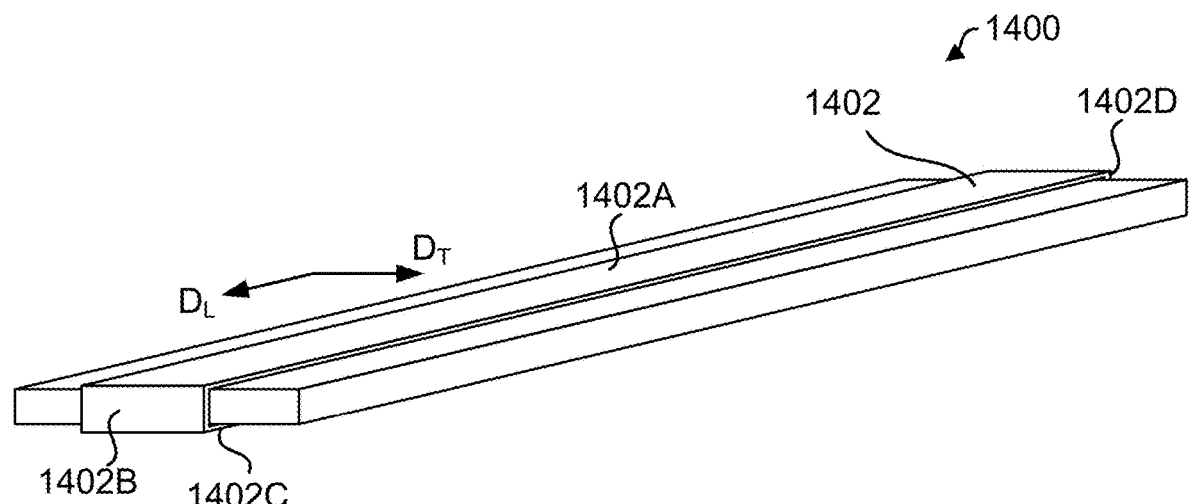
FIG. 14 shows an example of a permanent magnet with an electrically insulating layer.

FIG. 14 shows an example of a permanent magnet 1400 with an electrically insulating layer 1402. The permanent magnet 1400 and/or the electrically insulating layer 1402 can be used with one or more other examples described elsewhere herein. The permanent magnet 1400 is here shaped in form of a rectangular block. The rectangular block has a longitudinal dimension DL. For example, the longitudinal dimension is parallel to a rotation axis of the rotor (e.g., FIGS. 1-3). The rectangular block has a transverse dimension DT. The transverse dimension is substantially perpendicular to the longitudinal dimension. For example, the longitudinal dimension corresponds to the length, and the transverse dimension to the width, of the permanent magnet 1400. The electrically insulating layer 1402 extends along an entirety of the longitudinal dimension. For example, the electrically insulating layer 1402 can include a portion 1402A extending along the entire length of a top of the permanent magnet 1400; a portion 1402B extending from an end of the portion 1402A and across an entire thickness of the permanent magnet 1400; a portion 1402C extending from an end of the portion 1402B along the entire length of a bottom of the permanent magnet 1400; and a portion 1402D extending from an end of the portion 1402C, across the entire thickness of the permanent magnet 1400, and meeting an end of the portion 1402A. The electrically insulating layer 1402 is narrower than the transverse dimension of the permanent magnet 1400.

The electrically insulating layer 1402 can be applied to the permanent magnet 1400 in any of various ways. In some implementations, the electrically insulating layer 1402 includes insulating tape wrapped around the permanent magnet 1400. For example, the insulating tape can include polyvinyl chloride or polyimide. In some implementations, the electrically insulating layer 1402 is a coating applied to the permanent magnet 1400.

Figure 15:
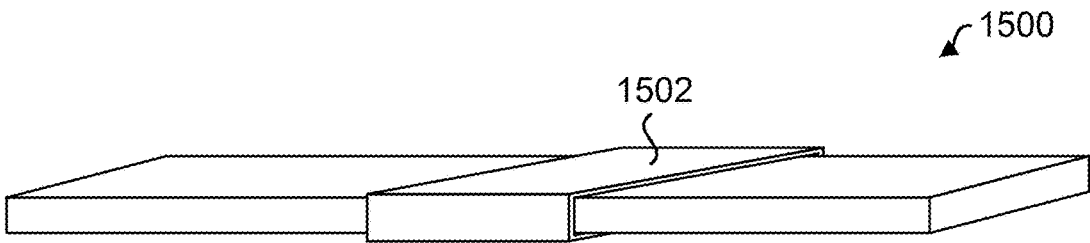
FIG. 15 shows another example of a permanent magnet with an electrically insulating layer.

FIG. 15 shows another example of a permanent magnet 1500 with an electrically insulating layer 1502. The permanent magnet 1500 and/or the electrically insulating layer 1502 can be used with one or more other examples described elsewhere herein. The permanent magnet 1500 is here shaped in form of a rectangular block. In contrast to the example described above with reference to FIG. 14, the electrically insulating layer 1502 is applied in a direction perpendicular to the rotational axis of the rotor.

The electrically insulating layer 1502 is narrower than the longitudinal dimension of the permanent magnet 1500. The electrically insulating layer 1502 extends along an entirety of the transverse dimension. For example, the electrically insulating layer 1502 can be a band of material that extends around a circumference of the permanent magnet 1500. The permanent magnet 1500 and the electrically insulating layer 1502 can include respective materials as mentioned in any of the examples described herein.

Figures 16A, 16B:
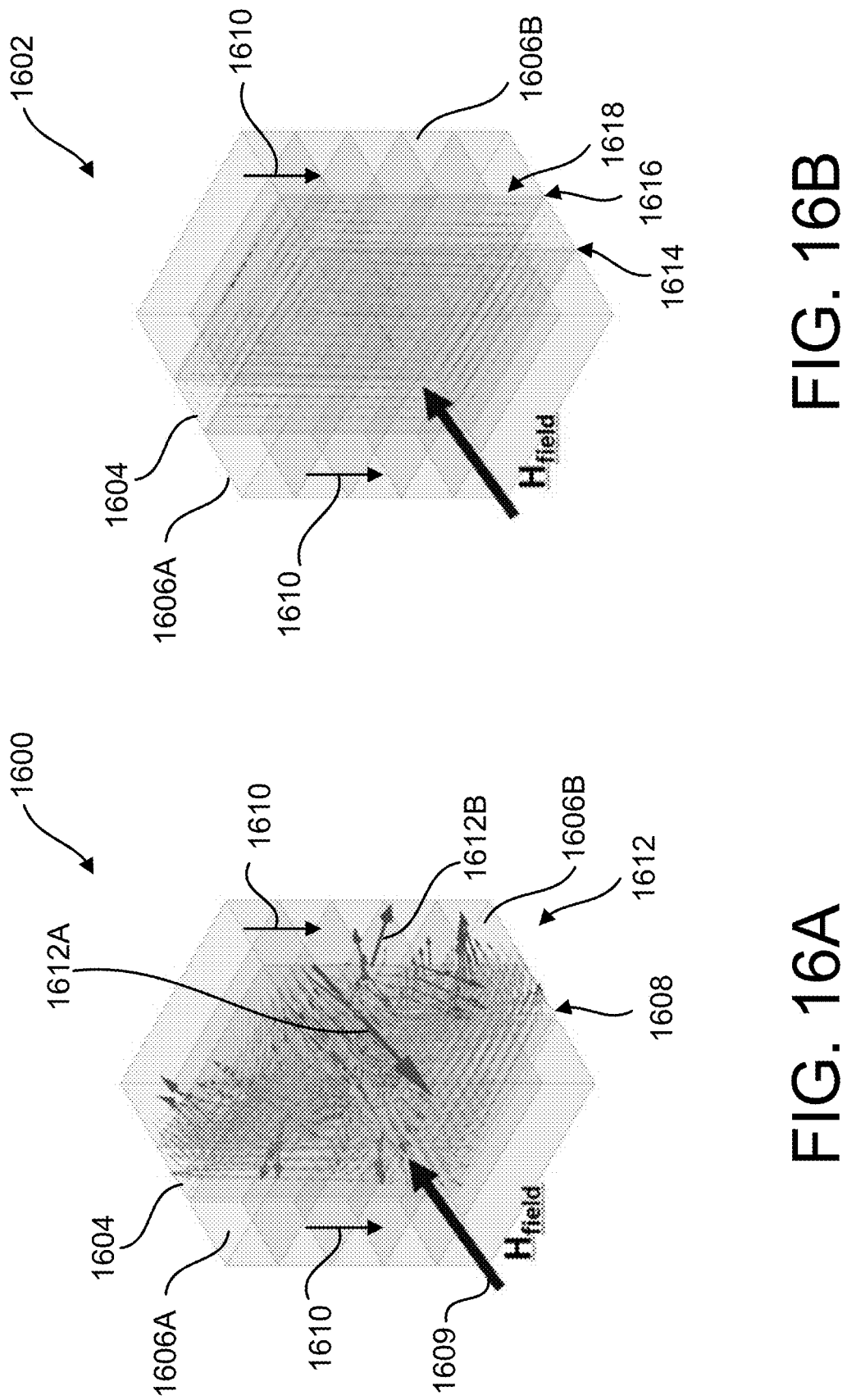
FIGS. 16A-16B show examples of qualitative simulations of eddy current paths.

FIGS. 16A-16B show examples 1600 and 1602 of qualitative simulations of eddy current paths. The examples 1600 and/or 1602 can be used with one or more other examples described elsewhere herein. The examples 1600 and/or 1602 are related to the examples 1100 and 1102 shown in FIGS. 11A-11B, and show simulated current paths three-dimensionally.

Both of the examples 1600 and 1602 show a permanent magnet 1604 with a rotor lamination portion 1606A on one side and a rotor lamination portion 1606B on an opposite side. For example, with reference again briefly to FIG. 6, the permanent magnet 1604 and the rotor lamination portions 1606A-1606B can be the portions of a rotor indicated by the area 616 of the rotor lamination 610.

In the example 1600, an electrically insulating layer 1608 is situated between the permanent magnet 1604 and the rotor lamination portion 1606A. On the other hand, no electrically insulating layer is situated between the permanent magnet 1604 and the rotor lamination portion 1606B. For example, the permanent magnet 1604 can be electrically short-circuited to (e.g., abutting) the rotor lamination portion 1606B. That is, the permanent magnet 1604 may be covered by an anti-corrosion layer, but the anti-corrosion layer does not provide electrical insulation.

An arrow 1609 indicates that an H magnetic field exists in the rotor during operation of the electric motor, the H magnetic field extending through the rotor lamination portion 1606A, the permanent magnet 1604, and the rotor lamination portion 1606B. As a result of the H magnetic field, eddy currents are induced in the rotor. More particularly, eddy currents can be induced in the rotor core and the permanent magnet 1604 due to space harmonics created by the magnetic field of the stator and also due to harmonics from switching performed in the inverter of the electric motor.

The simulation on which the example 1600 is based illustrates how current densities (e.g., measured in ampere per square meter, or A/m²) can be distributed in the rotor body and the permanent magnet 1604, given the absence of any electrically insulating layer between the permanent magnet 1604 and the rotor lamination portion 1606B. Here, eddy currents can be induced inside the rotor lamination portions 1606A-1606B, as indicated by arrows 1610. Eddy currents can also be induced inside the permanent magnet 1604, as indicated by arrows 1612. For example, arrows 1612A and 1612B indicate that the current densities are such that eddy currents are circulating between the permanent magnet 1604 and the rotor lamination portion 1606B.

Induction of eddy currents is associated with losses and other suboptimal performance. For example, the eddy currents associated with the arrows 1612A and 1612B circulate between the permanent magnet 1604 and the rotor lamination portion 1606B and as such generate heat in the rotor due to electric resistance, thereby dissipating energy. As another example, due to the expected heat generation the temperature in the permanent magnet 1604 will reach a certain level during the expected operation of the electric motor; the permanent magnet 1604 must therefore be selected so as to have a temperature rating that accommodates the expected operating temperature. Generally speaking, a permanent magnet with a higher temperature rating costs more than a permanent magnet with a lower temperature rating. As such, the rotor in the example 1600 is subject to eddy current losses due to the eddy currents circulating between the permanent magnet 1604 and the rotor lamination portion 1606B, and also subject to the requirement of a relatively high temperature rating for the permanent magnet 1604.

In the example 1602, an electrically insulating layer 1614 is situated between the permanent magnet 1604 and the rotor lamination portion 1606A. Also, an electrically insulating layer 1616 is situated between the permanent magnet 1604 and the rotor lamination portion 1606B. As such, in the example 1602 the permanent magnet 1604 is not short-circuited to either of the rotor lamination portions 1606A-1606B. Arrows 1618 indicate that eddy currents are induced in the permanent magnet 1604, but that no (or relatively little) eddy currents circulate between the permanent magnet 1604 and either of the rotor lamination portions 1606A-1606B. That is, certain components of eddy currents can be reduced or eliminated. As such, the rotor in the example 1602 is subject to little or no eddy current losses due to current circulation between the permanent magnet 1604 and either of the rotor lamination portions 1606A-1606B, and also the permanent magnet 1604 can have a lower temperature rating.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method of manufacturing a rotor for an electric motor, the method comprising:

positioning a permanent magnet within a magnet hole formed in a rotor body, wherein the rotor body and the permanent magnet are to form a rotor for an electric motor;

providing an electrically insulating layer between the permanent magnet and a surface of the rotor body, wherein the surface at least partially defines the magnet hole;

performing an electrical continuity test on the permanent magnet and the rotor body, the electrical continuity test performed while the permanent magnet is within the magnet hole and the electrically insulating layer is between the permanent magnet and the surface of the rotor body;

determining, based on the electrical continuity test, whether the electrically insulating layer provides at least a threshold electric insulation between the permanent magnet and the rotor body, the threshold electric insulation corresponding to prevention of eddy currents circulating between the permanent magnet and the rotor body; and based on the electrically insulating layer providing at least the threshold electric insulation between the permanent magnet and the rotor body, approving the rotor for the electric motor.

2. The method of claim 1, wherein performing the electrical continuity test comprises contacting the permanent magnet with a first test lead, contacting the rotor body with a second test lead, and applying i) a voltage between the first and second test leads, or ii) a current to at least one of the first or second test leads.

3. The method of claim 1, wherein the electrical continuity test and the determination are performed before assembling the rotor into the electric motor, the method further comprising, based on the electrically insulating layer providing at least the threshold electric insulation between the permanent magnet and the rotor body, assembling the rotor into the electric motor.

4. The method of claim 1, wherein providing the electrically insulating layer between the permanent magnet and the surface of the rotor body comprises applying the electrically insulating layer to the permanent magnet and thereafter inserting the permanent magnet and the electrically insulating layer into the magnet hole.

5. The method of claim 4, wherein applying the electrically insulating layer to the permanent magnet comprises covering an entire outside of the permanent magnet with the electrically insulating layer.

6. The method of claim 4, wherein applying the electrically insulating layer to the permanent magnet comprises covering only part of an outside of the permanent magnet with the electrically insulating layer.

7. The method of claim 1, wherein providing the electrically insulating layer between the permanent magnet and the surface of the rotor body comprises applying the electrically insulating layer inside the magnet hole and thereafter inserting the permanent magnet into the magnet hole.

8. The method of claim 7, wherein applying the electrically insulating layer inside the magnet hole comprises applying the electrically insulating layer to an entire inside surface of the magnet hole.

9. The method of claim 7, wherein applying the electrically insulating layer inside the magnet hole comprises applying the electrically insulating layer to part of an inside surface of the magnet hole.

10. The method of claim 1, wherein the permanent magnet has an anti-corrosion layer covering an outer surface of the permanent magnet, and wherein providing the electrically insulating layer between the permanent magnet and the surface of the rotor body comprises positioning the electrically insulating layer between the anti-corrosion layer of the permanent magnet and the surface of the rotor body.

11. The method of claim 1, wherein the rotor comprises multiple permanent magnets positioned in respective ones of multiple magnet holes in the rotor body, the multiple magnet holes having respective surfaces, wherein the electrically insulating layer is provided between each of the multiple permanent magnets and the respective surface in the respective magnet hole of the rotor body, and wherein i) the electrical continuity test and ii) the determination are performed for each of the multiple permanent magnets.

* * * * *